Oct. 17, 1961
J. L. THOMAS
3,005,147
SHORT CIRCUIT PROTECTION FOR A TRANSISTORIZED POWER SUPPLY
Filed Aug. 12, 1957
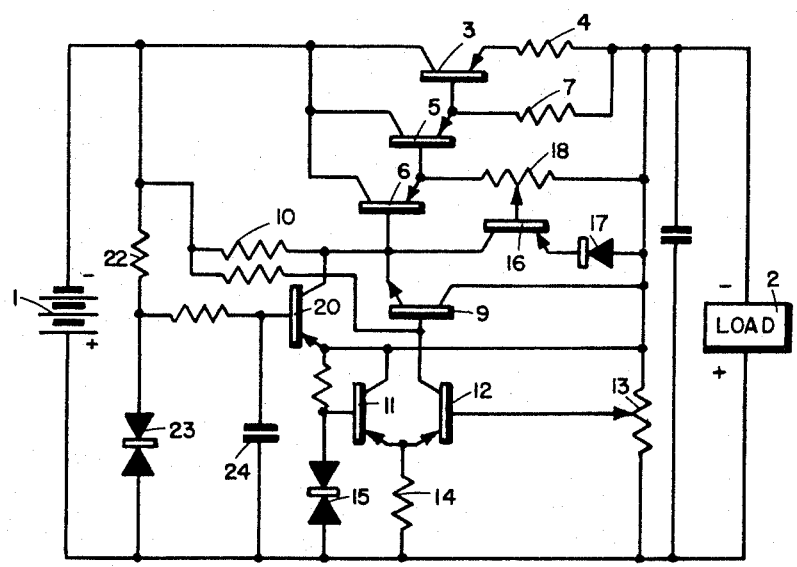
INVENTOR.
JAMES L. THOMAS
BY *John A. Duffy*
AGENT

United States Patent Office 3,005,147
Patented Oct. 17, 1961

3,005,147
SHORT CIRCUIT PROTECTION FOR A
TRANSISTORIZED POWER SUPPLY
James L. Thomas, La Habra, Calif., assignor to
North American Aviation, Inc.
Filed Aug. 12, 1957, Ser. No. 677,702
4 Claims. (Cl. 323—9)

This invention relates to an overload protection circuit and more particularly to a circuit for protecting sensitive elements in electrical circuitry from overloads in current and voltage.

Semi-conductor devices with their short thermal time constants have dictated a need for new and better overload protection devices. Conventional methods of overload protection, such as the well known metal fuse and the circuit breaker have become highly unsatisfactory in circuitry employing transistors and other semi-conductor elements because of their relatively long time delay between receiving the overload signal and opening the electrical circuit. Using a fuse in a transistor circuit provides very little protection to the transistor. A current in excess of the rating for a given transistor will cause the transistor to burn up before the fuse can operate to cut off the current.

Circuits for protecting semi-conductor devices from currents in excess of their rating have been designed which maintain the current flow through the device below a predetermined maximum value. Such circuits do not provide adequate protection for the transistor however because, for example, in a regulated voltage power supply circuit utilizing a power transistor for supplying current to a load, a circuit for preventing current through the load from exceeding a predetermined maximum value will still not prevent an excess of voltage drop and power dissipation from burning out the power transistor. In order to fully protect any transistor in series between a source and a load, low voltage portection must be provided as well as over-current protection.

The device of this invention gives complete protection to semi-conductor elements in an electrical circuit by providing means for opening the circuit when a low voltage occurs across the load tending to cause an excess in the voltage drop across the elements needing protection. In addition to maintaining the current in the circuit below a predetermined value, a circuit is also provided which removes the sources from the load when the voltage across the load falls to a predetermined value. A fast acting electronic switch employing semi-conductor devices is employed which automatically opens the circuit upon receipt of a low voltage signal. The switching circuit's time constant is immediate and automatic preventing any damage to the sensitive elements in the electric circuit.

It is therefore an object of this invention to provide an improved overload protection circuit.

It is another object of this invention to provide a low voltage protection circuit.

It is still another object of this invention to provide a circuit for protecting semi-conductor devices from overload.

It is a further object of this invention to provide a circuit for protecting semi-conductor devices from excess power dissipation caused by low voltages.

It is a still further object of this invention to provide a fast acting electronic switch for opening a current supply circuit to a semi-conductor device when the current and voltage characteristics reach a predetermined dangerous load.

Other objects will become apparent from the following description taken in connection with the drawings which comprise a single figure which is a schematic diagram of an embodiment illustrating the invention.

According to an embodiment of this invention an overload protection circuit is provided in a regulated power supply which operates to disconnect the source from the load in the power supply when the voltage across the loads falls below a predetermined value. A signal translating device for supplying current to a load from a source has connected in parallel therewith a protection circuit for controlling the current through said signal translating device in accordance with the voltage across the load. As long as the voltage across the load remains above the predetermined value, the low voltage protection circuit remains inoperative. However, upon receipt of a signal by the low voltage protection circuit, indicating that the voltage across the load has fallen to the predetermined dangerous level, the protection circuit operates to cut off the current flowing through the signal translating device, thus protecting the device and any other semi-conductor devices in the power supply circuit from damage.

There is shown in the single figure a circuit for supplying current from direct current source 1 to a load 2 which may vary. In series with source 1 and load 2 and placed between them is signal translating device 3 which is a P-N-P transistor having its emitter connected through resistor 4 to the negative side of load 2 and its collector connected to the minus side of source 1. Connected in cascade with transistor 3 are transistors 5 and 6 with the base of transistor 3 connected to the emitter of transistor 5 and the base of transistor 5 connected to the emitter of transistor 6. Transistors 5 and 6 operate in cascade with transistor 3 with their combined gain equal to the product of the individual gains of the respective transistors. Transistors 5 and 6 are otherwise operatively connected having their collectors connected to the minus side of source 1 and their emitters connected through resistors 7 and 18 respectively to the minus side of load 2. The base of transistor 6 is connected to the emitter of transistor 9 which also has its emitter connected in common with the base of transistor 6 through bias resistor 10 to the minus side of source 1. The collector of transistor 9 is connected to the minus side of load 2. Transistor 9 is operatively responsive to a differential amplifier sensing circuit comprising transistors 11 and 12 with the base of transistor 12 connected to an intermediate point of resistor 13 to measure the voltage across load 2. Resistor 13 is connected across load 2. Transistors 11 and 12 have their emitters connected in common through resistor 14 to the plus side of source 1. The base of transistor 11 is connected to voltage reference device 15 which provides a constant voltage reference for the differential amplifier circuit. Voltage reference 15 is shown as zener diode but may be any other accurate voltage reference device such as a battery. The collector of transistor 12, reflecting the difference in the voltage at the base of transistor 12 and the reference voltage at the base of transistor 11, is connected to the base of transistor 9.

The circuit so far described operates as a voltage regulator with transistor 12 sensing the voltage across load 2, comparing it with reference voltage 15, and controlling transistor 9 in accordance therewith. Transistor 9 in turn controls current amplifying transistors 6 and 5 which control the current through transistor 3 in order to maintain the voltage across load 2 constant. Transistor 16 connected between the load 2 and the base of transistor 6 provides overload current protection for the circuitry. Transistor 16 has its emitter connected through diode 17 to the minus side of load 2 and its collector connected in common with the base of transistor 6 through resistor 10 to the minus side of source 1. Diode 17 establishes the emitter voltage of transistor 16. The base of transistor 16 is connected to an intermediate point of resistor 18. Resistor 18 is connected between the emitter of transistor 6 and the minus side of load 2. Resistor 18 provides a voltage to the base of transistor 16 which is proportional to the current flowing through load 2. Transistor 16 conducts when the current through load 2 rises to a predetermined maximum level and then operates to reduce the current therein to maintain constant maximum level. The base to emitter voltage of transistor 16 will cause transistor 16 to conduct when the voltage at the base of transistor 16, corresponding to the rise in current through load 2, reaches the cutoff level. Conduction of transitor 16 causes an increase in current through resistor 10 in the collector circuit which in turn lowers the base voltage of transistor 6 and thereby in turn, through transistor 5, reduces the flow of current through transistor 3. All transistors shown are of the P-N-P type.

Thus far, a circuit has been described which provides overload current protection for a voltage regulated power supply However, in order to provide complete protection for the transistors and other semi-conductor devices, the circuit must be protected from the effect of low voltages across the load. A low voltage and constant current through the load will cause an excessive voltage drop and resulting excessive power dissipation in transistor 3. The circuit of this invention provides a low voltage protection circuit which includes transistor 20 having its collector connected in common with the base of transistor 6 through resistor 10 to the minus side of source 1 and its emitter connected in common with the collector of transistor 11 to the minus side of load 2. The voltage at the emitter is equal to the voltage across the load. The base of transistor 20 is connected through resistor 21 to a point between resistor 22 and voltage reference 23. Voltage reference 23, which may be a zener diode as shown, in conjunction with resistor 22 establishes a predetermined low voltage level at the base of transistor 20. Any voltages across load 2 less than this level would damage the transistors in the circuit. Transistor 20 will conduct when the voltage at its emitter, which is equal to the voltage across load 2, falls below the reference voltage 23. Resistor 21, connected in series between the base of transistor 20 and zener diode 23, and capacitor 24 connecting the base of transistor 20 to ground provides a time delay between the voltage across the load and the voltage at transistor 20. Delaying the application of a low voltage from load 2 to transistor 20 allows the voltage across load 2 to rise to normal value when the circuit is first energized.

In operation, source 1 is supplying load 2 with a voltage maintained constant by the voltage regulating circuit described hereinbefore and the current is maintained below a maximum level by the overload current protection circuit provided by transistor 16. Now assume that the impedance through load 2 becomes relatively small due to a partial short circuit or the like. Immediately the current tends to rise above the maximum level. The current protection circuit of transistor 16 operates to maintain the current through load 2 below the maximum level and this results in a decrease in voltage across load 2 because the impedance of load 2 will fall without a corresponding increase in current. The voltage regulator circuit is prevented by the overload current protection circuit from raising the voltage due to the fact that the current through transistor 16 is large enough when applied to the base of transistor 6 to completely overcome any effect that sensing transistor 12 may have on the base of transistor 6. When the voltage across load 2 falls to the predetermined level of reference 23 the potential at the base of transistor 20 with respect to its emitter causes transistor 20 to conduct. Conduction of the emitter-collector circuit of transistor 20 causes an increase of current through resistor 10. The increase of current through resistor 10 causes an increase in potential drop across the resistor, thereby lowering the voltage at the base of transistor 6. Conduction in transistor 6 decreases and this decrease is cascaded through transistors 5 and 3 causing a decrease in current through transistor 3. The decrease in current through transistor 3 results in a further decrease in voltage across load 2 which when reflected to the emitter of transistor 20 causes an increase in current through transistor 20 and a further decrease in voltage at the base of transistor 6. A regenerative action thereby results causing transistor 20 to be saturated and transistor 3 to be cut off. Thus, the voltage across load 2 becomes zero.

Operation of the low voltage protection circuit when a complete short circuit is created across load 2 is substantially as described above. A short circuit across load 2 results in an immediate drop of voltage across the load to zero. This causes transistor 20 to conduct heavily, thereby completely cutting off transistor 3 through the action heretofore described. No current is allowed to flow through transistor 3 thereby protecting that transistor and other devices in the circuitry from being burned out by excessive voltages and currents.

The low voltage protection circuit described has a very fast time response to a short circuit. Transistor 20 may be selected from a type wherein a slight change in the emitter to base voltage causes a corresponding immediate decrease in current through the transistors of the power supply circuit. Because of the nature of a transistor it is easy to select one from commercial sources which will conduct heavily, responsive to only slight variations in emitter to base potential. Thus, transistor 20 will operate to cut off transistor 3 before damage is done to transistor 3. In addition, transistor 20 may be selected with a small power rating, for example 100 milliwatts, to protect semi-conductor power devices such as transistor 3 with ratings approaching one hundred watts.

The embodiment disclosed shows a low voltage protection circuit as applied to a voltage regulated power supply. Various other applications of the low voltage protection principle are readily apparent. Sensitive electrical instruments could be completely protected without affecting their accuracy by the insertion of the low voltage protection circuit including transistor 20 in a manner similar to that described for the power supply circuit. It is also readily apparent that an N-P-N type transistor could be used instead of the P-N-P type for transistor 20 with standard design modifications to the circuitry.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An overload protection circuit comprising a signal translating device having a pair of output electrodes and a control electrode for supplying current to a load from a source, means for controlling the current through said signal translating device in accordance with the current through said load, said means comprising means for establishing a voltage proportional to the current through said load, means for establishing a first reference voltage, current comparison means for comparing said voltage proportional to the current through said load with said first reference voltage, and means for connecting the output of said current comparison means to said control electrode for controlling said signal translating device in response thereto when said voltage proportional to said load current is greater than said first reference voltage, means for controlling the current through said signal translating device in accordance with the voltage across said load, said means comprising means for establishing a voltage proportional to the voltage across said load, means for establishing a second reference voltage, means for comparing the voltage across said load and said second reference voltage, and means for connecting the output of said voltage comparison means to said control electrode for causing said signal translating device to cease conducting when said load voltage is less than said second reference voltage.

2. The combination recited in claim 1 wherein said voltage comparison means comprises an electronic valve having a pair of output electrodes and a control electrode, one of said output electrodes connected to receive a voltage proportional to the voltage across said load, and said control electrode connected to receive said second reference voltage, the other of said output electrodes connected to present the difference voltage between said load voltage and said second reference voltage to the control electrode of said signal translating device.

3. In combination a first transistor having a collector, an emitter, and a base, said collector and emitter connected to supply current to a load from a source, a second transistor having a collector, an emitter, and a base, a reference voltage source, the base of said second transistor connected to receive a voltage proportional to the current through said load, the emitter of said second transistor connected to receive said reference voltage, and means for connecting the collector of said second transistor to the base of said first transistor to present the difference voltage between the voltage proportional to said load current and said reference current to said base for controlling said first transistor, a third transistor having a collector, an emitter and a base, a reference voltage source, the base of said third transistor connected to receive a voltage proportional to the voltage across said load, the emitter of said third transistor connected to receive said reference voltage, and means for connecting the collector of said third transistor connected to the base of said first transistor to present the difference voltage between said load voltage and said reference voltage to said base to cause said first transistor to cease conducting when said load voltage is less than said reference voltage.

4. The combination recited in claim 3 wherein is included a time delay circuit connected between the emitter and base of said third transistor for delaying the presentation of said load voltage to the emitter of said third transistor when said load is initially receiving current from said first transistor.

References Cited in the file of this patent

UNITED STATES PATENTS

| 2,460,860 | Volpigno | Feb. 8, 1949 |
| 2,571,027 | Garner | Oct. 9, 1951 |
| 2,693,568 | Chase | Nov. 2, 1954 |
| 2,697,811 | Deming | Dec. 21, 1954 |
| 2,767,330 | Marshall | Oct. 16, 1956 |
| 2,832,900 | Ford | Apr. 29, 1958 |